Figures 10, 11:
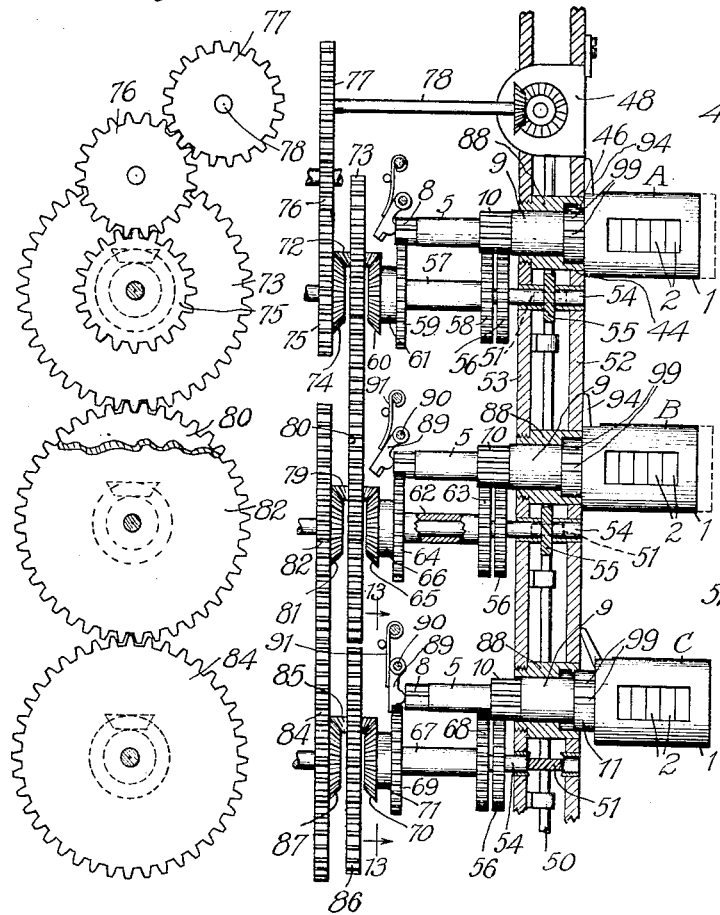

W. J. CRUMPTON.
REGISTER ACTUATING MECHANISM.
APPLICATION FILED MAY 12, 1909. RENEWED MAR. 12, 1915.
1,157,620.
Patented Oct. 19, 1915.
3 SHEETS—SHEET 1.
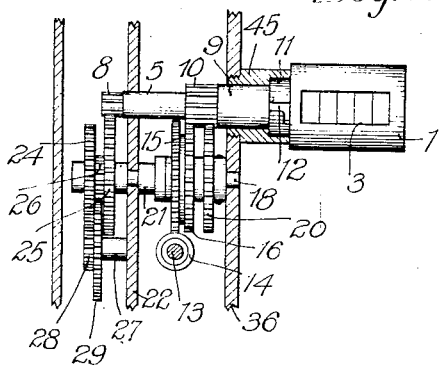
Fig. 1.
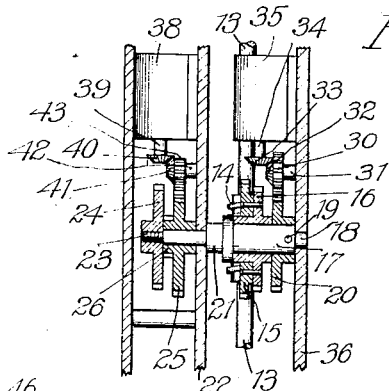
Fig. 2.
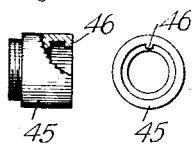
Fig. 4.
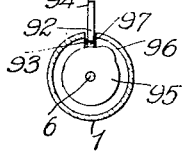
Fig. 5.
Fig. 6.
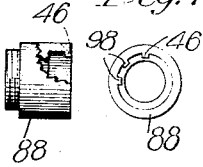
Fig. 7.
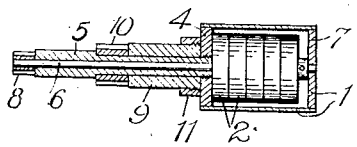
Fig. 3.
Fig. 9.
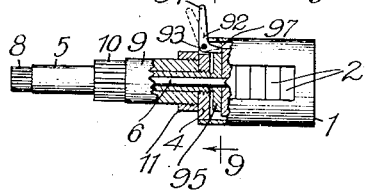
Fig. 8.
Witnesses:
Leonard W. Novander
George E. Higham
Inventor
William J. Crumpton
By Brown & Williams
Attorneys W. J. CRUMPTON.
REGISTER ACTUATING MECHANISM.
APPLICATION FILED MAY 12, 1909. RENEWED MAR. 12, 1915.

1,157,620.

Patented Oct. 19, 1915.
3 SHEETS—SHEET 2.

Witnesses:
Leonard W. Novander
George E. Higham

Inventor
William J. Crumpton
By Brown & William
Attorneys

W. J. CRUMPTON.
REGISTER ACTUATING MECHANISM.
APPLICATION FILED MAY 12, 1909. RENEWED MAR. 12, 1915.

1,157,620.

Patented Oct. 19, 1915.
3 SHEETS—SHEET 3.

Witnesses:
George E. Higham.
Leonard W. Novander.

Inventor
William J. Crumpton
By Brown Williams
Attorneys

UNITED STATES PATENT OFFICE.

WILLIAM J. CRUMPTON, OF EVANSTON, ILLINOIS, ASSIGNOR, BY MESNE ASSIGNMENTS, TO WILLIAM R. HEATH, OF BUFFALO, NEW YORK.

REGISTER-ACTUATING MECHANISM.

1,157,620.  Specification of Letters Patent.  Patented Oct. 19, 1915.

Application filed May 12, 1909, Serial No. 495,417. Renewed March 12, 1915. Serial No. 13,970.

*To all whom it may concern:*

Be it known that I, WILLIAM J. CRUMPTON, a citizen of the United States, residing at Evanston, in the county of Cook and State of Illinois, have invented a certain new and useful Improvement in Register-Actuating Mechanism, of which the following is a full, clear, concise, and exact description, reference being had to the accompanying drawings, forming a part of this specification.

This invention relates to register-actuating mechanisms and has for one of its main features a loose register, complete in itself, adapted to be temporarily associated with any of a plurality of actuating mechanism, either for accumulation or decumulation. The construction of these actuating mechanisms is such that they are normally disconnected from the source of power and can be connected therewith only by properly inserting the loose register. The accumulating mechanism may have permanently connected therewith a wage-register and, if desired, also a time-register. These registers can therefore not be actuated unless there is inserted a loose register into the opening provided for that purpose. When this is done, not only is the actuating mechanism automatically connected with the source of power so that the wage-register and the time-register are actuated, but the loose register itself becomes connected with the mechanism so that all of the registers receive concurrent actuations in predetermined ratios. The wage-register and the loose register, which will ordinarily be the job-register, have the same rate of actuation, which may, however, be varied at will, by simply substituting for one of the gears in the mechanism a gear of the size necessary to effect the desired change of rate.

Another feature of my invention consists in a decumulating mechanism with which a plurality of loose job-registers may be simultaneously connected so as to be decumulated thereby. This decumulating mechanism has permanently connected therewith a totalizing register which is actuated in a posititive direction an amount equal to the sum of the actuations of the decumulating registers, so that the indications of the latter are transmitted into the totalizing register. One of the details connected with this decumulating arrangement is that the loose registers are provided with means for automatically disconnecting the register from the mechanism when the zero mark is reached. Another feature connected with this decumulating mechanism is the provision on each register of a characteristic mark which is a sort of mechanical way-bill and is so constructed that it will coöperate with a corresponding mark associated with the decumulating mechanism when the register is sought to be inserted in one of the openings in the wall or panel behind which the decumulating mechanism is situated. In order to effect proper insertion of a loose register into an opening to connect the register with the decumulating mechanism, it is necessary that the mark on the register correspond with the mark associated with the particular opening or set of openings. In this way it can be determined beforehand into which opening or set of openings a loose register must be inserted in order to be decumulated or reset. Therefore, it is impossible to decumulate a register into the wrong totalizer, thus avoiding errors which would otherwise be easy of occurrence.

These and various other features of novelty will become apparent during the course of the detailed description of the embodiment of my invention illustrated in the accompanying drawings, in which—

Figure 12:
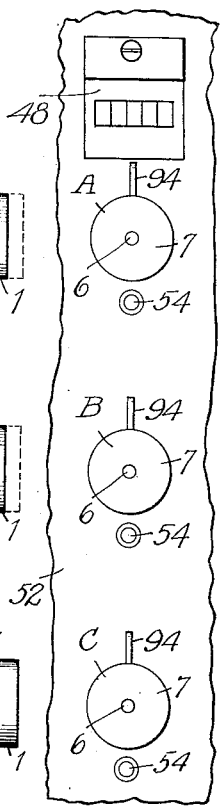
Figure 13:
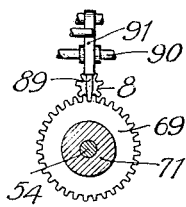
Figure 14:
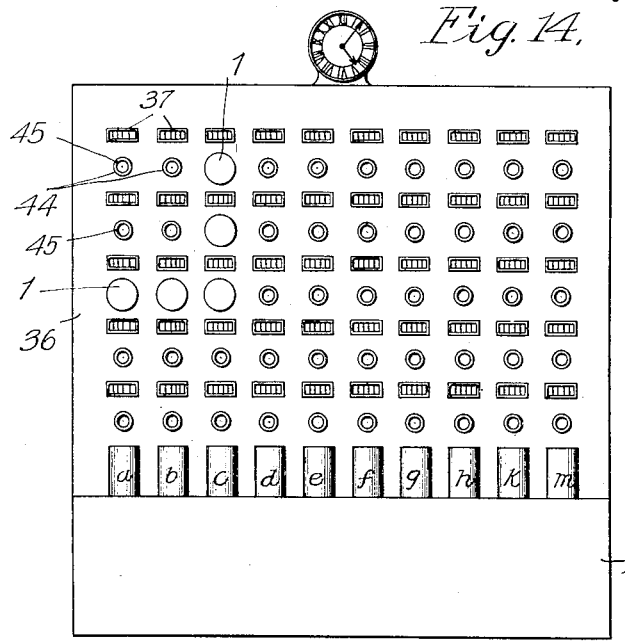
Figure 15:
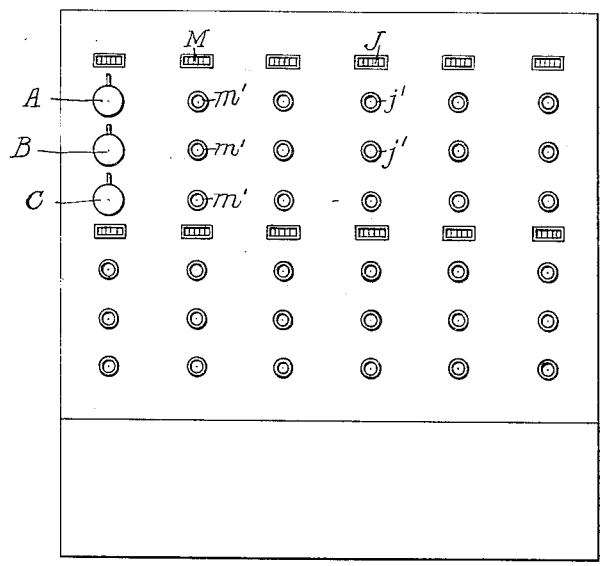

Figure 1 is a vertical side view, partly in section, showing a loose register associated with the accumulating mechanism; Fig. 2 is a top view, partly in section, of the accumulating mechanism showing a connected wage-register and time-register; Fig. 3 is a partly cross-sectional view of a simple form of loose register, with internal carry-over mechanism, not shown; Fig. 4 is a side view, partly broken away, of the thimble or bushing which is secured in each one of the openings in the panel behind which the accumulating mechanisms for the loose registers are situated; Fig. 5 is a front view of the bushing; Fig. 6 is a side view, partly broken away and in section, of a bushing adapted to be inserted in one of the openings in the panel behind which are situated the decumulating mechanisms, this bushing being provided with peculiarly arranged lugs on the inner periphery; Fig. 7 is a front view of the bushing shown in Fig. 6; Fig. 8 is a side view, partly broken away and cross-sectional; of a modified form of loose register so constructed that it will be automatically disconnected when the zero point has been reached in the decumulation; Fig. 9 shows a cross-sectional view taken on line 9—9, Fig. 8; Fig. 10 represents a vertical side view of a suitable form of decumulating mechanism showing several registers associated therewith, the lowermost register being shown in a disconnected position; Fig. 11 is a side view of the gearing of the decumulating mechanism; Fig. 12 is a side view of the arrangement shown in Fig. 10 looking at the figure from the right; Fig. 13 illustrates a view taken on line 13—13, Fig. 10; Fig. 14 is a view showing the front panel of a casing or housing in which the accumulating mechanisms are contained; and Fig. 15 represents a front view of the housing in which the decumulating mechanisms are inclosed.

I shall first take up the description of the loose register as shown in Figs. 1 and 3. This register comprises a casing 1 within which is housed the indicating mechanism. Fig. 3 shows the numeral wheels 2 arranged in regular order as is common in the ordinary and well understood register devices used for various purposes. The sight opening 3 permits a reading of the register indications. I have not deemed it necessary to show the carry-over wheels or any of the minor details that appear in registers of this kind, for the reason that all such particulars of construction are well understood by those skilled in the art. In the rear wall 4 of the casing is secured, as by screw threading, sleeve 5, in which is rotatably mounted the spindle 6. It is upon this spindle that the numeral wheels are supported, as indicated in Fig. 3, the units wheel being rigidly secured thereto. The front end of the spindle 6 finds bearing in the front head 7 of the register casing. To the lower end of the spindle is secured the pinion 8 which in the construction of the register would ordinarily be cast integral with the spindle. Upon the narrow portion of the sleeve 5 is fimly fixed a second sleeve 9. In the space between the enlarged portion of the sleeve 5 and the sleeve 9 is rotatively mounted the idle gear 10. To the screw-threaded end of sleeve 9 is secured the annular member 11 provided with a bayonet slot 12.

One of the accumulating mechanisms with which the above-described register is intended to be associated is shown in Figs. 1 and 2. Running lengthwise of the housing in which the accumulating mechanisms are situated is a power shaft 13. It will, of course, be understood that there are as many of these shafts as there are horizontal rows of actuating mechanisms. Thus, for instance, in Fig. 14, I have shown five of such rows, so that there would be five of these power shafts in that particular arrangement. The shaft 13 has rigidly mounted thereon the worm 14 which meshes with the teeth of the gear wheel 15 seated upon the hub of the gear wheel 16 and rigidly connected therewith. The gear wheel 16 is loosely supported on the sleeve member 17, which is fixed upon the shaft 18 by means of the pin 19 or otherwise. Secured to the sleeve 17 is the gear wheel 20, so that rotation of the latter will be communicated to the shaft 18. A bushing 21 resting at one end against the partition 22 and at the other end against the hub of the gear wheel 16, holds the latter against lateral movement on the sleeve 17. To the rear end 23 of the shaft 18 is screw-threaded the gear wheel 24. Between this gear and the partition 22 is the gear member 25 which is pivoted upon the shaft 18. The hub portion 26 of this gear member is provided with teeth upon its outer periphery so as to form a pinion. To the stub 27 secured to the partition 22 are pivoted the gear wheels 28 and 29 rigidly connected together. Meshing with the gear wheel 20 is a pinion 30 pivoted on the stub 31. This pinion has associated therewith the bevel gear 32 which engages the bevel gear 33 on the shaft 34 projecting from the casing of the time-register 35. This register is shown as being carried by the panel 36 although it may be supported independently thereof in any convenient manner. The sight openings of the time-registers are presented toward the front panel and are indicated at 37 in Fig. 14. A wage-register 38 is supported on the partition 22 and has projecting therefrom a shaft 39 provided with the bevel gear 40 which engages with the bevel gear 41 mounted on the stub 42. Rigidly connected with the bevel gear 41 is the pinion 43 which engages the gear wheel 25.

In each of the openings 44 in the panel 36 is secured, as by screw-threading, a bushing 45 which is shown detached in Figs. 4 and 5, and shown in place in Fig. 1. On the inner periphery of this bushing is a lug 46 adapted to coöperate with the bayonet slot 12 to permit proper insertion of the register and prevent accidental loosening of the same.

With this description of the loose register and the accumulating mechanism therefor, the operation of the device will now be clear.

Assuming the power shaft 13 to be uniformly actuated from some suitable source, as by a clock-controlled motor, and assuming that the loose register in Fig. 1 is removed, it will be observed that the actuations of the power shaft are communicated to the gear wheels 15 and 16, but inasmuch as these members are loosely mounted upon the sleeve 17, no further actuation of the mechanism will occur, and the associated wage-register and time-register will not be operated. When, however, a loose register is properly inserted, as shown in Fig. 1, the idler 10 will span the gear wheels 16 and 20, and the pinion 8 will, at the same time, engage the gear 26. With the parts in this position, the actuations of the power shaft are transmitted from the gear wheel 16 to the gear wheel 20 through the medium of the idler 10. It might thus be said that the gears 16 and 20 constitute a normally inoperative clutch connection between the shafts 13 and 18, and that the idler carried by the register renders such connection operative when the register is inserted. The gear 20 being thus connected with the shaft 13 will transmit the actuations of the latter through the auxiliary shaft 18 to the gear wheel 24. From this point motion is transmitted to the gears 28 and 29, and from there to the gear wheels 26 and 25. The gear wheel 25 actuates the wage-register 38 through the medium of gears 43, 41 and 40, and also actuates the loose register by means of the gear 8 carried thereby. The gear wheel 20, besides actuating the shaft 18, also actuates the time-register 35 through the gear connections 30, 32 and 33. From this it will be seen that a workman's wage-register and time-register cannot be actuated unless a loose job-register is properly associated therewith. In other words, the actuating or transmission mechanism with which a workman's wage-register and, if desirable, also time-register, is permanently associated, is normally disconnected from the source of power for actuating the mechanism, and that an operative connection is automatically established, between the source of power and the mechanism, upon the insertion of a loose register. It is true, therefore, that the connections between the three registers and the source of power are controlled by the loose job-register, the insertion of the latter establishing such connections and the removal breaking such connections. The gear arrangement is, of course, such that the wage-register and job-register will properly indicate a man's wages, while the time-register will correctly indicate the time during which the wage-register was actuated, which simply means the time for which the workmen are to be credited. If it is desired to change a workman's rate of wages, it is only necessary to remove the gears 24 and 28 and substitute a pair of gears of the proper number of teeth to effect the desired change in the rate of actuation. This change will affect the gear wheel 25, and therefore the wage-register and the loose job-register, since both of these registers are actuated through the gear wheel 25. The time-register, however, would not be affected by this change in the rate of actuation, for the reason that it is operated independently of the gear wheel 25.

The manner in which these loose registers will be handled in a factory is something like the following: When a workman arrives in the morning he goes to the place where the loose registers are kept (in Fig. 14 the loose registers lettered a to m are shown in a box-like attachment 47 in front of the panel), and knowing the particular job on which he is to start work, he takes a register assigned to that job and inserts it in his opening in the panel, thereby automatically connecting his wage-register, time-register and job-register with the time-controlled shaft. When his work on that job is finished, he removes the register and replaces it by another register assigned to the job which he is to take up next. For instance, if a workman was to start work on job a, he would take a register marked a and insert it in his opening in the panel. Similarly, if a workman was to start work on job a, he would select a register marked k and insert it in his particular opening in the panel. Now, it might happen that a workman, on arriving in the morning, does not know on what job he is to begin work. In this case, in order that he might not be deprived of his due wages during the time for which he has not been assigned to any job, he takes a waste-wage-register and inserts it in his opening in the panel. For the sake of convenience these waste-wage-registers might be of a color readily distinguishable from that of the ordinary job-registers. As soon as the workman knows to what job he well be assigned, he removes the waste-wage-register and inserts in place thereof a job register assigned to the particular job. At the end of the day's work each man removes the loose register from his opening in the panel and returns it to its customary place.

In order to ascertain the amount of work done on a particular job, the job-registers belonging thereto will, at the end of the day or at any desired period, be inserted in a decumulating mechanism by which the registers will be automatically brought back to zero, and at the same time, their indications transferred into a summation register. This brings us to the description of the decumulating mechanism, of which one form is illustrated in Figs. 10 to 13.

The summation register 48 may be removably supported in the panel 52. This register is permanently connected with the associated differential decumulating mechanism. When I say "permanently" I do not mean, of course, that the register remains in such association all the time. I use the term in contradistinction to the temporary connection between the mechanism and the loose registers to be decumulated. In the particular form illustrated in Figs. 10 and 11, this decumulating mechanism comprises three differential sets and accommodates at the same time three loose registers. The mechanism may, of course, be extended to permit the simultaneous decumulation of any number of loose registers. A shaft 50 extends vertically through the casing in which the decumulating mechanism is housed, and is provided with as many spiral gears 51 as there are differential sets in the mechanism. In Fig. 10 three of these gear wheels are shown. Suitably supported in the front panel 52 and the partition 53 are the shafts 54 extending rearwardly in the housing. Each of these shafts is provided with a spiral gear 55 which is arranged to engage with a spiral gear 51 carried by the power shaft 50. The spiral gear 55 is not shown on the lowermost shaft 54, for the reason that the latter is broken away at that point to expose the associated spiral gear 51. A gear 56 is fixed upon each of the shafts 54. Mounted on the free portion of the outer shaft 54 is a sleeve 57, provided at one end with a gear 58, which is adjacent to the gear 56, and at the other end is provided with a gear 59 to which is rigidly attached the bevel gear 60 through the connecting portion 61. Similarly, upon the second shaft 54 is loosely mounted a sleeve 62 having at one end a gear 63 adjacent to the associated gear 56 and at the other end having a gear 64, to which is attached the bevel gear 65 through the connecting portion 66. The lowermost shaft 54 is in the same manner provided with a sleeve 67 loosely mounted thereon. One end of this sleeve carries a gear 68 adjacent to the associated gear 56, while the other end is provided with a gear 69, to which is attached the bevel gear 70 through the connecting piece 71. The bevel gear 60 engages the bevel pinion 72 pivoted in the gear 73, which forms the central member of the differential set of which the side members are gears 60 and 74. Rigidly connected with gear 74 is the gear 75, which engages the idler 76, this, in turn, engaging the gear 77 on the shaft 78 of the totalizing register 48. The bevel gear 65 engages the bevel pinion 79 pivoted in the gear 80 which forms the central member of the differential set of which the side members are gears 65 and 81. The central gears 73 and 80 are in engagement with each other. The gear 81 has rigidly connected therewith the gear 82, which engages the gear 84. The bevel gear 70 engages the bevel pinion 85 pivoted in the gear 86 which forms the central member of the differential set of which the side members are gears 70 and 87. Gears 84 and 87 are rigidly secured together.

The front panel 52 and the partition 53 are provided with alined openings in which are secured bushings 88. A pair of these alined openings is associated with each one of the shafts 54, so that when a register is inserted through the bushing in the openings, the gear 8 will engage the gear 59, (or 64 or 69, as the case may be) and the idler 10 will engage the gear 56 and its adjacent gear 58 (or 63 or 68, as the case may be).

From the above description it will be apparent that unless a register is associated with one of the differential sets the rotations of the shaft 50 will not be communicated to the sleeve 57 (or 62 or 67) on that shaft. We can, perhaps, best get at the exact behavior of the arrangement shown in Fig. 10 by assuming the parts to be in the position in which they are shown and tracing the various paths through which the rotations of the shaft 50 are communicated to the loose registers and to the totalizing register. With register A inserted as shown, the rotation of shaft 50 is transmitted from gear 56 to the sleeve 57 through the medium of the idler 10 and the gear 58, and from there to bevel gear 60, pinion 72, side member 74, gear 75, idler 76, gear 77, and thence to the summation register. Now, if no other register is associated with that particular decumulating mechanism, the central gear 73 will remain stationary and the actuation of shaft 50 will be transmitted in the same ratio to the summation register and the loose register A. If register B is inserted in addition to the register A, a second transmission path will be opened between the shaft 50 and the summation register through the gear 63, sleeve 62, bevel gear 65, pinion 79, central gear member 80 (gears 81 and 82 being stationary), gear 73, pinion 72, gears 74 and 75, idler 76, gear 77, and from there to the register. Inasmuch as the actuation through this second path is transmitted to the central gear 73, the differential set to which this gear belongs will summate the actuations that take place over the two paths above described, so that with registers A and B both inserted, the summation register 48 will be actuated at a rate equal to the sum of the rates of actuation of the individual registers. If we imagine register C to be properly inserted so that the gear 8 engages the gear 69 and the idler 10 spans the gears 56 and 68, a third transmission path will be opened between the actuating shaft 50 and the summation register as follows: from the gear 68 (which receives the motion of gear 56 through the spanning idler 10) to gear 69, bevel gear 70, pinion 85, (gear 86 being held stationary) bevel gear 87, gear 84, gears 82 and 81, from there through the pinion 79 and central member 80, etc., continuing as before described. The actuation of the shaft 50 through this third transmission path will be communicated to the second differential set which will summate the actuations of the shaft 50 through the second and third of the described paths, while the first differential set will summate the actuations of the shaft through all of the three paths. So that, with registers A, B and C inserted, the rate of actuation of the summation register will be the sum of the rates of actuation of the individual registers. The decumulating mechanism might, in this manner, be extended to totalize the actuations of any desired number of simultaneously associated registers. In order that no actuation might be accidentally imparted to the sleeves 57, 62 and 67, when no corresponding register is in place, I have shown a locking means associated with each sleeve consisting of a pawl 89 pivoted at 90, and normally resting with its free end in the space between the teeth of the associated gear, as most clearly shown in Fig. 13. A spring 91 normally holds the pawl in its locking position, as illustrated in the lower part of Fig. 10. When a register is inserted, the end of the projecting spindle will engage the pawl and force it away from the teeth of the associated locking gear, as shown in connection with registers A and B in Fig. 10.

It will be observed that no register can be decumulated unless the gear 8 is in engagement with the gear 59 (or 64 or 69, as the case may be); that is to say, no register can be decumulated without at the same time actuating the totalizing register an equal amount, whereby the indications of the loose register are transferred into the totalizing register. To prevent the decumulation of a loose register beyond zero, I provide the same with a bell crank 92 pivoted in the rear head 4 of the register casing at 93, as shown in Figs. 8 and 9. The long arm 94 of this bell crank projects through an opening in the casing. The highest order numeral wheel has connected therewith a disk 95 provided with a cam portion 96. The angular position of this cam portion is such that at the moment when all of the numeral wheels reach zero and are about to pass beyond that, the cam portion will ride beneath the short arm 97 of the bell crank and raise the same, thereby moving it into the position shown in dotted lines in Fig. 8, and in full lines in the lower portion of Fig. 10. This movement of the bell crank causes the register to be forced out of its operative position an amount sufficient to cause disengagement between gear 8 and the gear on the associated sleeve, as shown in connection with register C in Fig. 10. This provision on each register of means for automatically disconnecting it from the decumulating mechanism when it has reached zero is very desirable, inasmuch as it dispenses with an attendant, who would otherwise have to watch the registers and remove each one as it reached zero.

There remains to be described the feature which renders the decumulation of any particular loose register possible only by a predetermined decumulating mechanism. Referring to Figs. 6 and 7, it will be noticed that the bushing 88, besides being provided with a lug 46, which is present also in the bushing used in connection with the accumulating mechanism, is also provided with a characteristic mark represented in Figs. 6 and 7 by the radial projections 98. Now, in order that a register might be properly inserted in an opening having such a bushing, it is necessary that the annular member 11 carried by the register on the sleeve 9 be provided with grooves which will register with the radial projections 98. In Fig. 10, the annular member 11 of each one of the registers is shown provided with grooves 99 having the same angular disposition as the projections 98 on the bushing 88, so that these projections will be accommodated in the grooves when the register is inserted in place for decumulation. By varying the number of projections on the bushing 88, or by varying their angular position with respect to the lug 46, and by providing sleeves 11 with correspondingly situated grooves, it is obvious that one may select beforehand the particular decumulating mechanism with which a register must be associated in order to be decumulated. Ordinarily the bushings 88 that belong to the same decumulating mechanism will be of the same kind, inasmuch as it makes no difference in which particular opening of the set of openings, that belong to a decumulating mechanism, a register is associated. Thus, for instance, the register A might just as well have been inserted in either one of the other two openings shown in Fig. 10. In Fig. 15 is shown the front panel of the housing which incloses twelve decumulating mechanisms arranged in six vertical rows with two totalizing mechanisms in each row. Any other arrangement may, of course, be resorted to.

Some one in the factory will have charge of attaching to the loose job-registers the bushings 11, which constitute a mechanical way-bill whereby the particular mechanism with which a certain register is to be associated for decumulation will be determined upon beforehand. So far as the accumulating mechanism is concerned, a particular register can be inserted in any one of the openings shown in Fig. 14. However, when it comes to resetting that particular register, it is necessary that it be inserted into one of a predetermined set of openings suggested in the arrangement of Fig. 15. For instance, let the second of the totalizing registers indicated at M in Fig. 15 be for the purpose of indicating the total of the work done on job $m$. In that case all of the registers marked $m$ would be provided with a bushing having grooves that will register with corresponding projections on the bushings that are secured in the openings $m'$.

Now, a workman assigned to job m will receive a register marked m and insert it in his opening in the panel 36. When, say job m is finished and it is desired to ascertain the total of the amount of wages paid out for that job, the registers marked m are inserted in the openings m', whereby their indications are transferred into the totalizing register M. It will not be possible to transfer the indications of these registers into a totalizing register intended for some other job—as for instance, register J intended for job j. In the same way the loose registers marked j can be decumulated only by inserting them in the openings j', whereby the total cost of that job is indicated by the totalizing register J. It will thus be seen that the annular member or bushing 11 serves in reality as a sort of mechanical way-bill, for the reason that it indicates the route which the register must go to be decumulated. By this means I positively prevent the labor done on one job being charged up to some other job. Of course, the coöperating characteristic marks on the bushings in the openings and on the register may consist of means other than projections on the bushings in the panel and grooves in the bushings on the registers. The particular arrangement shown has been solely for the purpose of illustration.

Furthermore, it will be apparent that certain features of my invention may be used without certain other features, and that the particular embodiment of my invention herein set forth has been for the sake of conveying a complete understanding of my invention and not as in any way limiting the invention to that embodiment, as should be clear from the appended claims. Besides, concerning my loose register, it will be apparent that the uses to which it can be put and the purposes which it may accomplish are indeed many, and I have made no endeavor to enumerate or discuss them. For instance, it may, in certain cases, be desirable to know just how much waste wages accrue to each workman. In such a case the loose register will be inserted for operation only during the interval that the workman has not been assigned to any particular job.

Having thus described my invention, what I claim as new and desire to secure by Letters Patent of the United States is:

1. In combination, a source of power, a plurality of registers, and means carried by one of said registers for operatively connecting all of the registers with said source.

2. In a register-actuating mechanism, the combination of a rotatable shaft, a wage-register and a time-register associated therewith, normally inoperative transmission gears adapted to connect said shaft with each of said registers, a loose register adapted to be temporarily connected with said transmission gears, and means carried by said loose register for establishing operative connection between said shaft and transmission gears, whereby the actuations of said shaft are concurrently transmitted to all of said registers in predetermined ratios.

3. In a register-actuating mechanism, the combination of a rotatable shaft, a pair of registers adapted to be concurrently actuated thereby, one of said registers being permanently and the other removably associated with said shaft, and means whereby the removal of said last-mentioned register automatically disconnects both of the registers from said shaft.

4. The combination of a register, mechanism for actuating the same, a loose register adapted to be readily brought into and out of association with said actuating mechanism, and means whereby said loose register when properly associated with said mechanism automatically establishes operative connection between said mechanism and both of the registers, and whereby the removal of said loose register automatically breaks operative connection between said mechanism and both of the registers.

5. The combination of a plurality of registers, mechanism for actuating the same, and means whereby one of said registers controls the connections between said mechanism and each of said registers.

6. The combination with time controlled register-actuating mechanism, of a loose register adapted to be readily brought into and out of operative association with said mechanism.

7. The combination of a plurality of registers, actuating mechanism therefor, one of said registers being readily removable, and means whereby the removal of said last-mentioned register automatically renders said mechanism inoperative, while the replacing of said register automatically restores said mechanism to operative condition to cause concurrent actuation of all of said registers.

8. The combination of a wage-register, an actuating mechanism therefor, and a job-register for establishing operative mechanical connection between said wage-register and said mechanism, said job-register being actuated concurrently with said wage-register.

9. The combination of a wage-register, a time-register, a common actuating mechanism for said registers, and a job-register for establishing operative mechanical connection between said mechanism and the two first-mentioned registers, said job-register being actuated concurrently with said other two registers.

10. The combination of a wage-register, a time-register, a job-register, a common actuating mechanism for said registers, and means whereby said wage-register and said time-register are mechanically actuated through said job-register.

11. In combination, a source of power, register-actuating mechanism normally disconnected therefrom, a pair of registers adapted to be concurrently actuated by said mechanism in opposite directions, so that the decumulation of one register is accompanied by a corresponding accumulation of the other register, and means carried by the decumulating register for mechanically controlling the connection between said mechanism and said source of power, said decumulating register being adapted to be readily brought into and out of association with said actuating mechanism.

12. In combination, a source of power, register actuating mechanism normally disconnected therefrom, a loose register adapted to be brought into association with said mechanism to be actuated thereby in a negative direction, means carried by said register for automatically making and breaking connection between said mechanism and said source of power as the register is brought into and out of association with said mechanism, and a totalizing register connected with said mechanism to be actuated thereby in a positive direction concurrently with said loose register, whereby the indications of the loose register are transferred into the totalizing register.

13. In a device of the kind described, the combination of register-actuating mechanism, a register permanently associated therewith, a power shaft normally disconnected from said mechanism, a loose register having a shaft projecting therefrom, a gear secured to the end of said shaft for actuating the register when brought into engagement with said mechanism, and an idler loosely mounted on said projecting shaft for connecting the mechanism and the power shaft together, whereby the two registers are actuated concurrently, said mechanism and said power shaft being automatically disconnected upon withdrawal of the loose register.

14. In a device of the class described, the combination of register-actuating mechanism, a wage-register permanently associated therewith, a power shaft normally disconnected from said mechanism, and a loose register having a pair of projecting gears adapted to engage said mechanism when said loose register is brought into association therewith, whereby said mechanism and said power shaft become connected for concurrently actuating the registers, said mechanism and said power shaft being automatically disconnected upon withdrawal of the loose register.

15. In combination, a source of power, a register, decumulating mechanism for connecting the register with the source of power, and mechanical devices actuated by said register for controlling the connection with said source of power when said register is decumulated a predetermined amount.

16. In combination, a source of power, a register, decumulating mechanism for connecting the register with the source of power, and mechanical devices actuated by said register for interrupting the connection between said source of power and said register when said register is decumulated a predetermined amount.

17. In a device of the kind described, the combination with a plurality of register-actuating mechanisms having each associated therewith a characteristic mark, of a loose register adapted to be associated with said mechanism for actuation, and provided with an identifying mark which coöperates with one of said first-mentioned marks to permit association of the register only with the mechanism to which the coöperating mark belongs.

18. In a device of the kind described, the combination with a plurality of register-actuating mechanisms, of a loose register adapted to be associated therewith for actuation, and means for compelling association of the register with a certain preselected one of said mechanisms when it is desired to actuate the register.

19. In a device of the kind described, the combination with a plurality of register-actuating mechanisms having each associated therewith a characteristic mark, of a loose register adapted to be associated with said mechanism for actuation, and provided with an identifying mark which coöperates with one of said first-mentioned marks to permit association of a register only with the mechanism to which the coöperating mark belongs, the identifying mark on the register being readily removable and replaceable by a different mark to preselect the particular mechanism with which the register is intended to be associated.

20. In a device of the kind described, the combination of a plurality of register-actuating mechanisms, a wall or panel behind which said mechanisms are situated, said panel having a set of openings for each mechanism, a bushing secured in each opening and provided with a characteristic mark, the bushings in the openings belonging to the same mechanism having the same mark, a loose register having means adapted to be inserted through said bushing into said openings for temporarily connecting the register with the desired mechanism, and a mark carried by said loose register adapted to coöperate only with the mark belonging to a particular set of bushings, whereby it is necessary to insert the register into one of a predetermined set of openings in order to effect operative connection between the register and the associated mechanism.

21. In a device of the kind described, the combination of a plurality of register actuating mechanisms, a wall or panel behind which said mechanisms are situated, said panel having a set of openings for each mechanism, a bushing secured in each opening and provided with a characteristic mark, the bushings in the openings belonging to the same mechanism having the same mark, a register having a shaft projecting therefrom adapted to be inserted through said bushings into said openings, a gear secured to said shaft for connecting the register with the associated mechanism when the shaft is properly inserted, a bushing carried by said shaft and having a mark adapted to coöperate only with the mark belonging to a particular set of bushings, whereby it is necessary to insert the register into one of a predetermined set of openings in order to effect operative connection between the register and the associated mechanism.

22. In a device of the kind described, the combination of a plurality of register-actuating mechanisms each including a plurality of differential gear sets, a panel behind which the mechanisms are situated, said panel having a set of openings for each mechanism, there being an opening for each differential set, a bushing secured in each opening and provided with a characteristic mark, the bushings and the openings which belong to the same mechanism having the same mark, a plurality of loose registers having each a shaft projecting therefrom adapted to be inserted through said bushings into said openings, a gear secured to said shaft for connecting the properly inserted register with the associated mechanism, a bushing carried by said shaft and having a mark adapted to coöperate only with the mark belonging to a particular set of bushings, whereby it is necessary to insert the register into one of a predetermined set of openings in order to effect operative connection between the register and the associated mechanism, a totalizing register connected with each mechanism, a normally disconnected power shaft associated with each mechanism, and means carried by each of said loose registers for automatically connecting the mechanism with the power shaft when the register is properly inserted, whereby the actuations of the loose registers associated with any one mechanism are concurrently summated in the connected totalizing register through the differential sets.

23. In a device of the kind described, the combination of a plurality of register-actuating mechanisms, a plurality of loose registers adapted to be temporarily associated therewith for actuation, means carried by each register for predetermining the particular mechanism with which the register shall become associated in order to be actuated, and means for totalizing the actuations of the registers associated with any one of said mechanisms.

24. In a device of the kind described, the combination of a totalizing register, a plurality of loose registers adapted to be simultaneously associated therewith, a corresponding plurality of differential gear sets with which said totalizing register is connected, a rotatable shaft normally disconnected from said gear sets, and means carried by each of said loose registers for transmitting the rotation of said shaft through an associated loose register to the corresponding differential set, whereby the actuations of the loose registers are summated in said totalizing register through said differential sets.

25. In a device of the kind described, the combination of a rotatable shaft, a plurality of loose registers adapted to be associated with said shaft for concurrent actuation, and means for automatically totalizing the actuations of the associated registers, said totalizing means being operated by said shaft through each one of said loose registers.

26. In a device of the kind described, the combination of a plurality of independent transmission paths, a differential gear set in each one of said paths, a rotatable shaft adapted to be connected with said transmission paths, a plurality of loose registers adapted to be readily brought into and out of association with said shaft, means carried by each of said registers for connecting the shaft with one of said transmission paths through the loose register when the same is associated with the shaft, and a totalizing register connected with said differential sets so that the actuations of the associated loose registers are automatically summated by said totalizing register.

27. In a device of the kind described, the combination of a rotatable shaft, a totalizing register, transmission mechanism for actuating said register in a positive direction, said mechanism being adapted to be operated by said shaft but normally disconnected therefrom, a loose register adapted to be temporarily brought into operative association with said shaft for decumulation, means whereby the association of said loose register with said shaft automatically connects said transmission mechanism and said loose register with the shaft to cause concurrent actuations of the registers in opposite directions, whereby the indications of the loose register are transferred to the totalizer, the removal of said loose register automatically breaking connection between said shaft and said mechanism, and means for automatically disconnecting the loose register when the same is cleared.

28. In a device of the kind described, the combination of a rotatable shaft, a totalizing register, differential transmission mechanism for actuating said register in an opposite direction, said mechanism being adapted to be operated by said shaft but normally disconnected therefrom, a plurality of loose registers adapted to be temporarily associated with said shaft for concurrent decumulation, means whereby the association of said loose register with said shaft automatically connects the transmission mechanism and the loose registers with the shaft to cause concurrent actuation of the connected loose registers and the totalizing register in opposite directions, whereby the indications of the loose registers are summated through said differential mechanism in said totalizing register, and means for automatically disconnecting each loose register as it is cleared.

29. In a device of the kind described, the combination of a register-decumulating mechanism, a loose register adapted to be temporarily associated therewith for decumulation, and means carried by the loose register for automatically disconnecting the register when it is cleared.

30. In a device of the kind described, the combination of a register-decumulating mechanism, a loose register adapted to be temporarily associated therewith for decumulation, means for totalizing the decumulations of the register, and means carried by the register for automatically disconnecting the register when it is cleared.

31. In a device of the kind described, the combination of a register-decumulating mechanism, a loose register adapted to be temporarily associated therewith for decumulation, means for totalizing the decumulations of the register, and means carried by the loose register for automatically forcing the register bodily out of connection with the mechanism when the register passes through zero.

32. In a device of the class described, the combination with an actuating mechanism, of a workman's loose register adapted to be readily brought into operative association with said mechanism to be actuated thereby at a predetermined rate, said register being loosely associated with said mechanism and readily removable therefrom.

33. In a device of the class described, the combination with a time-controlled mechanism of a loose register adapted to be readily brought into operative association with said mechanism to be actuated thereby at a predetermined rate, said register being loosely associated with said mechanism and readily removable therefrom.

34. In combination, a source of power, two registers, mechanism for connecting the registers to the source of power to accumulate the first one of said registers and decumulate the second one of said registers, and mechanical devices for controlling the connection between said registers and said source of power when said second register is decumulated a predetermined amount.

35. In combination, a source of power, two registers, mechanism for connecting the registers with the source of power to accumulate the first one of said registers and decumulate the second one of said registers, and mechanical devices for interrupting the connection between said registers and said source of power when said second register is decumulated a predetermined amount.

In witness whereof, I hereunto subscribe my name this 8th day of May A. D. 1909.

WILLIAM J. CRUMPTON.

Witnesses:
LEONARD W. NOVANDER,
A. A. THOMAS.